June 9, 1964 W. R. BACKER 3,136,098
TORQUE RESPONSIVE CONTROL FOR A MACHINE TOOL
Filed Feb. 5, 1962 3 Sheets-Sheet 1
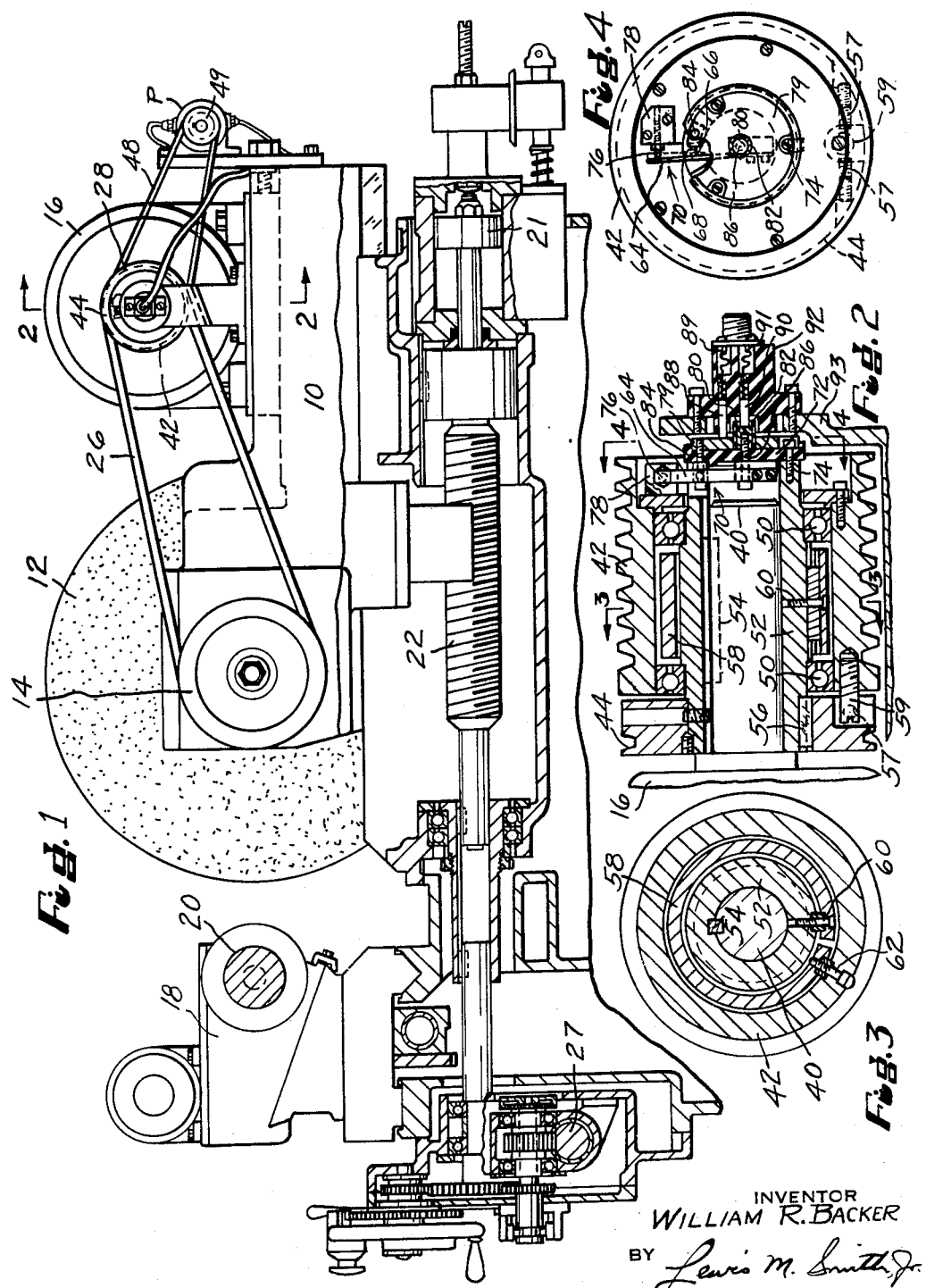
INVENTOR
WILLIAM R. BACKER
BY Lewis M. Smith Jr.
ATTORNEY

INVENTOR.
WILLIAM R. BACKER

June 9, 1964 W. R. BACKER 3,136,098
TORQUE RESPONSIVE CONTROL FOR A MACHINE TOOL
Filed Feb. 5, 1962 3 Sheets-Sheet 3

INVENTOR.
WILLIAM R. BACKER
BY
Lewis M. Smith, Jr.
ATTORNEY

United States Patent Office 3,136,098
Patented June 9, 1964

3,136,098
TORQUE RESPONSIVE CONTROL FOR A MACHINE TOOL
William R. Backer, Holden, Mass., assignor to Norton Company, Worcester, Mass., a corporation of Massachusetts
Filed Feb. 5, 1962, Ser. No. 170,899
5 Claims. (Cl. 51—165)

This invention relates to machine tools and especially to grinding machines and to torque-transmitting means responsive to a torque of predetermined level to control or regulate the operation of the grinding machine.

The principal objects of this invention are to provide multiple control torque-transmitting means for effecting control of the operation of a grinding machine or the like, at least one of which is operable independently of and unaffected by the torque transmitted by the other torque-transmitting means and to provide multiple torque-transmitting means which is responsive to torque loads of different levels operable, independently of each other and/or collectively, to provide control for different phases of the operation of the machine, or to terminate operation of the machine in the event of overload.

As herein illustrated, the invention resides in the combination with the drive shaft of a machine tool and apparatus adapted to be driven thereby; of first and second torque-transmitting means connecting the apparatus to the shaft, at least one of the torque-transmitting means being responsive to a torque of predetermined amount to produce a signal independently of the torque transmitted through the other of the torque-transmitting means and means operable, by the signal, to effect modification of the operation of the machine. Additional driving elements on the shaft may be connected thereto by the torque-transmitting means. In one form, two driving elements are arranged concentrically on the shaft. One torque-transmitting means connects the inner driving element to the shaft and another torque-transmitting means connects the outer driving element to the inner driving element. For two-level control the outer driving element is provided with a sheave and for dual-purpose control both the outer and inner driving elements are provided with sheaves. Alternatively, the two driving elements may be spaced axially on the shaft and each may be connected thereto by torque-transmitting means.

The invention will now be described in greater detail with reference to the accompanying drawings wherein:

FIG. 1 is an end view partly in section of a typical grinding machine showing a dual pulley connected to the motor shaft for driving both the grinding wheel and a pump;

FIG. 2 is a section taken on the line 2—2 of FIG. 1, of the dual pulley showing the torque-transmitting device associated therewith;

FIG. 3 is a section taken on the line 3—3 of FIG. 2;

FIG. 4 is a section taken on the line 4—4 of FIG. 2;

Figure 5:
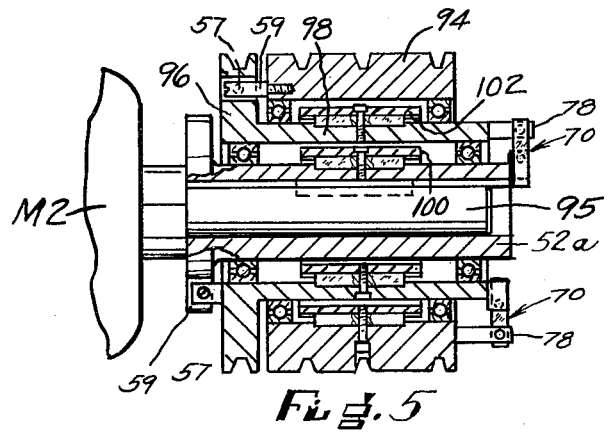
FIGS. 5, 6 and 7 are schematic views of additional embodiments of the invention.
Figure 6:
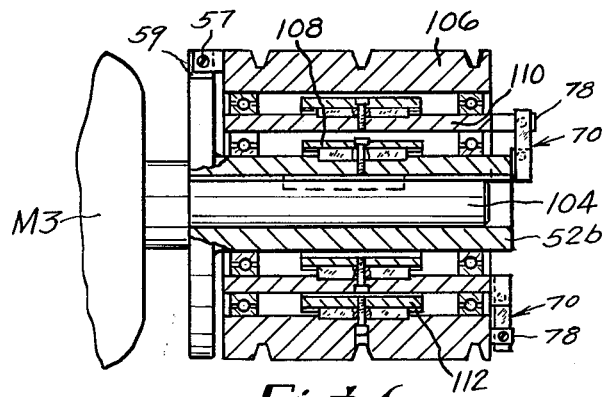
Figure 9:
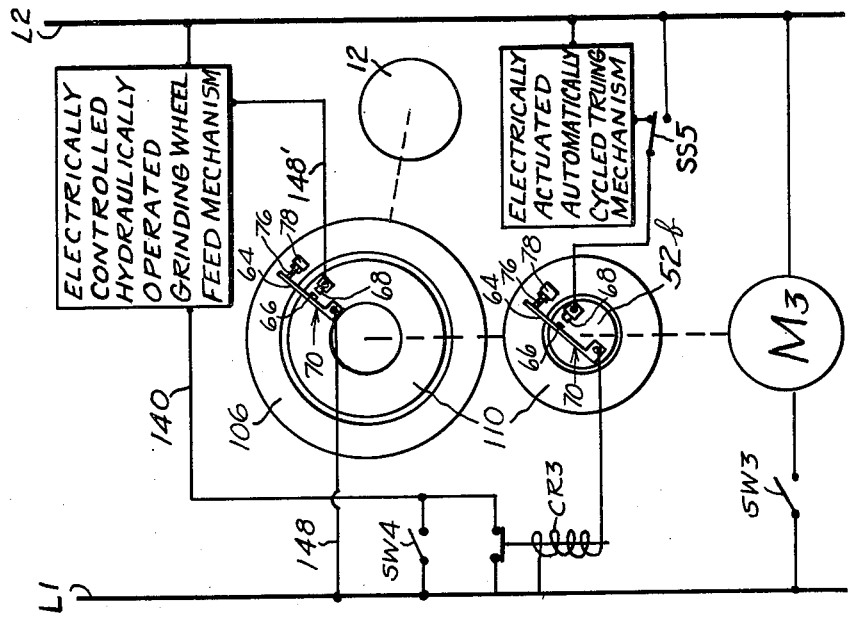
Figure 8:
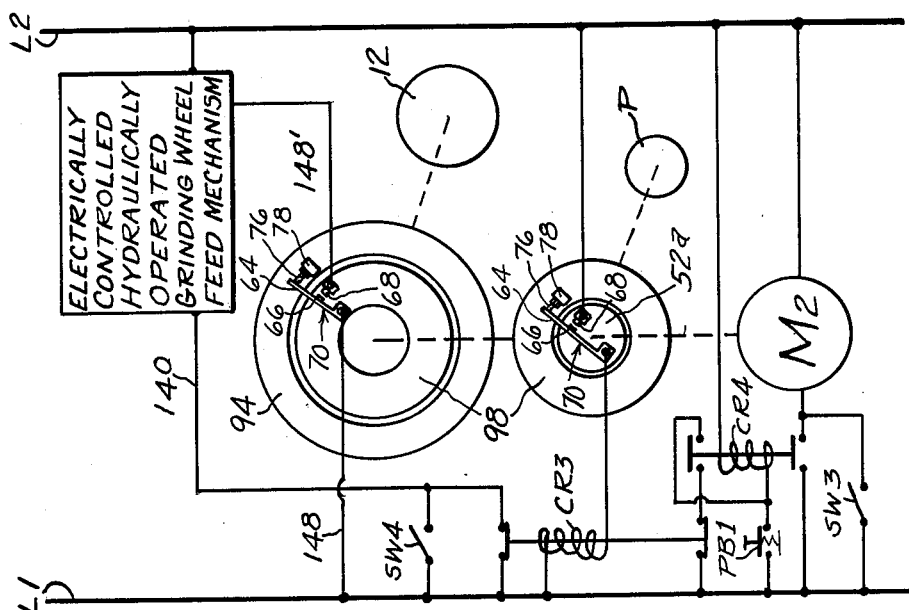

FIG. 8 is a simplified schematic representation of an electrical control circuit including the pair of switch assemblies incorporated in the embodiment of the instant invention illustrated in FIG. 5; and FIG. 9 is a simplified schematic representation of an electrical control circuit including the pair of switch assemblies incorporated in the embodiment of the instant invention illustrated in FIG. 6.

Referring to the drawings, the invention is illustrated herein in connection with a grinding machine of the type shown in the patent to Backer, No. 2,975,566, dated March 21, 1961, wherein a wheel slide 10 mounting a wheel 12, driving pulley 14 and motor 16 are movable relative to a work support 18 to bring the wheel into engagement with a work piece 20 supported thereon for grinding. Rapid infeed of the wheel 12 toward the work is provided for by a hydraulically-operated mechanism, including a piston 21, which effects axial movement of a feed screw 22 to advance the slide and hence the wheel up to the work and a slow, precise infeed of the wheel during the grinding operation is provided for by a hydraulically-operated mechanism, including a piston 27, which effects rotation of the feed screw 22. The details of construction and operation of the aforesaid mechanism are clearly described in the Backer patent to which reference may be had for such detailed information.

In the aforesaid Backer patent, the wheel 12 is driven by a belt 26 entrained about the pulley 14 and a sheave 28 on the shaft of the motor 16 and, in accordance with the invention disclosed therein, there is a torque-transmitting device situated between the sheave and the shaft operable, when the reactive torque reaches a predetermined level, to close a switch which, in turn, modifies the operation of the machine. The purpose of the invention disclosed in the Backer patent was to make it possible to feed the wheel 12 up to the work at a rapid rate and when the wheel makes contact with the work, by the sudden increase in reactive torque transmitted to the torque-transmitting means, to change the feed from "fast" to "slow," so that slow grinding infeed continues at a rate determined by the setting of the throttle valve, all of which is disclosed in the aforesaid patent. The purpose of this invention is to adapt a torque-transmitting device of the kind shown in the Backer patent to a grinding machine in which the motor not only drives the wheel but other means, for example, the pump which supplies the system with fluid pressure for operating the coarse and fine feed mechanisms without affecting the sensitivity of the torque-transmitting means and hence the operation of the control in the manner prescribed, due to fluctuations in the load imposed by the pump. It is to be understood, however, that the invention is not limited to use with a grinding machine or to a common drive for a wheel and pump, but may be used in conjunction with machines having, for example, two grinding wheels driven from the same shaft, a grinding wheel and one or more other apparatus driven from the same shaft, or for other than grinding machines where two or more apparatus are driven from a common shaft and selective and/or multi-level control is desired.

For the purpose of illustrating the invention herein, FIG. 1 shows the motor 16 having a drive shaft 40 on which there are mounted a multi-sheave pulley 42 and a single sheave pulley 44. The multi-sheave pulley drives, by way of suitable belts 26 arranged in conventional fashion, a pulley 14 fixed to the shaft of the grinding wheel 12 in the same fashion as shown in the Backer patent. The single sheave pulley 44, by way of a belt 48, drives a pulley 49 fixed to the drive shaft of a pump P.

The multi-sheave pulley 42 is rotatably supported by bearing assemblies 50—50 on a sleeve 52, seen best in FIG. 2, the latter being fixed to the shaft 40 by a key 54 and the single sheave pulley 44 is fixed to the sleeve 52 by a key 56, as shown in FIG. 2.

Opposed adjustable screws 57 are provided as shown in FIG. 4 to limit the extent of relative movement in either direction between a given drive means and a cooperating driven means. The screws 57 are adjustably positioned in the sheave 44 keyed to the shaft 40 and aligned to engage a pin 59 projecting from the sheave 42. It will be evident that the limit amount of deformation of the split ring 58, described further below, can be varied by suitable adjustment of the screws 57. An equivalent arrangement illustrated in FIG. 6 and elsewhere includes a lug projecting from a driving element provided with opposed flat surfaces 59 and disposed between screws 57 threadably engaging lugs projecting from the pulley 106. The latter arrangement is that shown in the above mentioned patent to Backer.

In accordance with this invention, relative movement of the multi-sheave pulley 42 and the shaft is afforded by a split ring 58, disposed about the sleeve 52 between it and the pulley 42, one end of which is fixed by means of a pin 60 to the sleeve 52 and the other end of which is fixed by a pin 62 to the pulley 42 so that there is a gap between the adjacent ends. As thus constructed, a reactive torque which produces resistance to rotation of the multi-sheave pulley 42 relative to the shaft 40 will deform the ring 58, allowing the pulley 42 to rotate relative to the shaft 40 an amount determined by the interaction of one of the screws 57 and pin 59 or equivalent elements as described above.

It is obvious that such relative rotation of the multi-sheave pulley 42 on the shaft 40 can take place without affecting the position of the single sheave pulley 44 and conversely that fluctuation in the reactive torque transmitted through the single sheave pulley 44 to the motor shaft will not affect the sensitivity of the torque-transmitting means between the multi-sheave pulley 42 and the shaft 40.

The relative movement of the multi-sheave pulley 42 and the shaft 40 is employed to provide control for the feed of the grinding wheel as related above with respect to the Backer patent by actuation of switch assembly 70. The switch assembly 70 includes a switch blade 64 as shown in FIGS. 2 and 4 fixed relative to the sleeve 52 by its attachment to the plate 72 at one side of the axis of rotation thereof. The blade 64 is provided with a contact point 66 disposed opposite and spaced from the contact point 68 of the switch assembly 70, also supported by the plate 72 fastened by bolts 74 to the end of the sleeve 52. The upper end of the blade 64 as seen in the drawings engages a pin 76 supported by a block 78 fastened to the end of the pulley 42, the pin 76 normally holding the blade 64 deflected so that the contacts 66 and 68 are separated. Rotation of the multi-sheave pulley 42 relative to the shaft in a direction to deform the ring 58 moves the pin 76 in a clockwise direction as shown in FIG. 4, so as to allow the contacts 66 and 68 to come together.

The plate 72 carries an annular conductor 79 and conductor pin 80 situated within the annular conductor and insulated therefrom by a sleeve 82. Conductor pins 84 and 86 connect the contacts 66 and 68 of the switch assembly 70 to the annular conductor 79 and conductor pin 80, respectively. Spring-pressed pins 88 and 90 supported by terminals 89 and 91 fixed in an insulating block 92 non-rotatably mounted on the pulley guard 93 provide for making a circuit through the switch and switch arm.

Operation of the torque-transmitting means, as described above, produces a signal in the form of a current pulse which will shift appropriate valves in the hydraulic system of the machine to cut off the pressure fluid from the piston of the fast feed mechanism and supply it to the piston of the slow feed mechanism in a manner identical with that disclosed in the above-mentioned Backer patent to which reference may be had for the details.

In addition, the invention may be so applied as to provide multi-level torque control. Thus, as shown somewhat schematically in FIG. 5, there is a motor M2 and motor shaft 95. A pair of pulleys 94 and 96 are mounted on the shaft 95 in concentric relation. The multi-sheave pulley 94 may be connected by belts to a grinding wheel drive pulley and the single sheave pulley 96 may be connected by a belt to a pump drive pulley. In this form of the invention, the single sheave pulley has an axially extending sleeve-like hub 98 which is connected to the sleeve 52a and thence to the shaft 95 by a torque-transmitting device 100 such as described above, one end being connected to the sleeve 52a keyed to the shaft 95 and the other to the hub 98 of the pulley. The multi-sheave pulley, in turn, is connected to the hub 98 of the single sheave pulley 96 by a torque-transmitting device 102. The torque-transmitting device 102 is designed to respond to a torque level lower than that of the torque-transmitting device 100, and hence will respond to a reactive torque of the wheel drive independently of a torque fluctuation in the pump drive. Should fluctuation in the pump drive become excessive, the torque-transmitting means 100 provides for shutting down the machine in response to an excessive total load thereon by closing suitable contacts as described above. One such arrangement is illustrated schematically in FIG. 8 in which the details of the electrically controlled hydraulically operated grinding wheel feed mechanism have been omitted since the details of such a mechanism are illustrated and described in Patent No. 2,975,566 referred to above, and since the specific features of such a mechanism form no part of the instant invention. While the torque-transmitting devices 102 and 100 are not illustrated in FIG. 8, it will be evident from the showing in FIG. 5 and the above description of the structure illustrated in FIG. 5 that the pulley 94 illustrated schematically in FIG. 8 is connected to the hub 98 by torque-transmitting device 102 and that the hub 98 is connected to the sleeve 52a and thence to the shaft 95 through torque-transmitting device 100. With this arrangement, the pulley 94 connected to the grinding wheel 12 through drive belts and a grinding wheel drive pulley as shown in FIG. 1 is displaced angularly relative to the hub 98 by a predetermined torque independent of the torque applied to the pulley 96 to close the contacts 66 and 68 of the switch assembly 70 supported on the hub 98 to effect a change in the operation of the wheel feed mechanism in the manner described in Patent No. 2,975,566 referred to above. When the total torque transmitted through shaft 95 from the motor M2 to the grinding wheel 12 and the pump P exceeds a predetermined critical amount, hub 98 is displaced angularly relative to the sleeve 52a sufficiently to allow the contacts 66 and 68 of the switch assembly 70 supported on the sleeve 52a to close to energize the coil of relay CR3, opening to sets of normally closed contacts controlled thereby.

With switch SW3 closed manually to energize the motor M2 and with switch SW4 open as shown in FIG. 8, the energization of relay CR3 will be effective only to interrupt the circuit including line 140 corresponding to line 140 in Patent No. 2,975,566 so that the wheel slide will be retracted. With switch SW4 closed manually and with switch SW3 open as shown in FIG. 8, the energization of relay CR3 will be effective only to deenergize the motor M2 by interrupting the conventional holding circuit including relay CR4 illustrated in FIG. 8 for maintaining the motor M2 energized after it has been started by closing manual push button PB1. With switch SW3 and switch SW4 both open as shown in FIG. 8 the energization of relay CR3 will be effective both to retract the wheel slide and to deenergize the motor M2 in shutting down the machine.

In the form of the invention shown in FIG. 6 a motor M3 drives a motor shaft 104. A multi-sheave pulley 106 is mounted on the shaft 104 by means of two torque-transmitting devices, an inner one 108 connected to the sleeve 52b and thence to the shaft 104 at one end and to a sleeve 110 concentric with the shaft 104 at the other end, and an outer one 112 connected at one end to the sleeve 110 and at the other end to the multi-sheave pulley 106. This provides for two-level response, that is, the opportunity for providing control for different torque levels, for example at one level to reduce the feed from "fast" to "slow" and then if the torque increases due to dullness of the wheel during the slow feed, to effect operation of means for retracting the slide and/or setting up an automatic truing or dressing cycle for the wheel.

A circuit arranged to function in this manner is illustrated schematically in FIG. 9 incorporating schematic representations of the sleeve 110 and the pulley 106 in relation to the sleeve 52b all illustrated in FIG. 6. The torque-transmitting devices 108 and 112 are not illustrated in FIG. 9 since the relationship between these devices and the sleeve 52b, the sleeve 110 and the pulley 106 is described above in relation to the showing in FIG. 6 and since these details form no part of the instant invention. FIG. 9 like FIG. 8 omits details of the grinding wheel feed mechanism illustrated and described in detail in Patent No. 2,975,566. In addition, FIG. 9 omits details of the electrically actuated automatically cycled truing mechanism since such mechanisms are already well known in the art and since the specific features of such a truing mechanism form no part of the instant invention.

Pulley 106 which may be connected to the grinding wheel 12 through drive belts and a grinding wheel drive pulley in the manner illustrated in FIG. 1 is displaced sufficiently by a predetermined torque to allow the contacts 66 and 68 of the switch assembly 70 supported by sleeve 110 to close to effect a change in the operation of the grinding wheel feed mechanism in the manner illustrated and described in Patent No. 2,975,566. With switch SW4 open as shown in FIG. 9 and with selector switch SS5 positioned as shown in FIG. 9 to include the truing mechanism in the circuit with relay CR3 and the switch assembly 70 supported on the sleeve 52b, angular displacement of the sleeve 110 relative to the sleeve 52b sufficient to allow the contacts 66 and 68 to close will energize relay CR3 to open a pair of normally closed contacts in a circuit including line 140 corresponding to line 140 in Patent No. 2,975,566 so that the wheel slide is retracted and the completion of the circuit through contacts 66 and 68 will initiate a cycle of operation of the truing mechanism. The contacts controlled by relay CR3 can be by-passed by closing switch SW4 and the truing mechanism can be by-passed by shifting the selector switch SS5 from the position illustrated in FIG. 9 to its other position.

Figure 7:
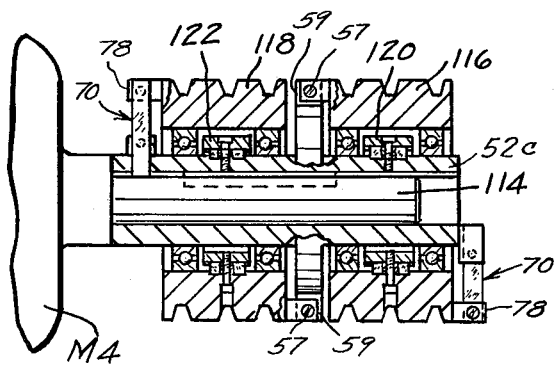

In certain machines two grinding wheels may be driven from a single shaft. Selective control may be had in such a machine at different torque levels as for one wheel independently of the other by the arrangement shown in FIG. 7 wherein a motor M4 drives a shaft 114 which has on it two multi-sheave pulleys 116 and 118, respectively connected to the shaft 114 by torque-transmitting devices 120 and 122 and the sleeve 52c. The torque characteristics of the torque-transmitting devices may be the same or different and operation of the torque-transmitting means may be employed to control or regulate other operations of the machine or for stopping the machine in the event of overload as previously explained.

It should be understood that the present disclosure is for the purpose of illustration only and that this invention includes all modifications and equivalents falling within the scope of the appended claims.

What is claimed is:

1. In a machine, the combination with a single drive shaft and two apparatus adapted to be driven by the single drive shaft, of interconnecting driving means including first and second apparatus driving elements on the shaft, first torque-transmitting means drivably connecting the first apparatus driving element to the shaft and second torque-transmitting means drivably connecting the second apparatus driving element to the first apparatus driving element, said second torque-transmitting means being responsive to a torque of predetermined level to produce a signal independently of the torque transmitted through the first torque-transmitting means, and means operable, in response to the signal produced by said second torque-transmitting means, to modify operation of a machine including the apparatus driven by the second apparatus driving element.

2. In a machine, the combination with a single drive shaft and apparatus adapted to be driven by the single drive shaft, of interconnecting drive means including a first pulley on the shaft having a hub extending axially therefrom along the shaft, a second pulley mounted on the hub, first torque-transmitting means connecting the hub of the first pulley to the shaft, second torque-transmitting means drivably connecting the second pulley to the hub of the first pulley whereby rotation of the shaft effects rotation of both pulleys and hence the apparatus connected thereto, and means responsive to transmission of a torque of predetermined level through the torque-transmitting means connecting the second pulley to the first pulley independently of the torque transmitted through the torque-transmitting means connecting the first pulley to the shaft to produce a signal, and means operable, by the signal, to modify operation of a machine including the apparatus driven by the second pulley.

3. In a machine tool, the combination with a single drive shaft and two or more apparatus driving means concentric of said shaft and adapted to be driven by the single drive shaft, of first and second torque-transmitting means connecting the apparatus driving means to the shaft, said first and second torque-transmitting means being responsive to different predetermined levels of torque to produce signals, and means operable, by the signal produced by each torque-transmittting means when the predetermined torque level of that means is reached, to change the mode of operation of the machine tool.

4. The combination with a single drive shaft and apparatus adapted to be driven by the single drive shaft, of interconnecting driving means including concentrically mounted first and second rigid annular driving elements on the shaft, a first torque-transmitting means drivably connecting the first rigid annular driving element to the shaft and a second torque-transmitting means drivably connecting the second rigid annular driving element to the first rigid annular driving element, said first torque-transmitting means being yieldably responsive to a torque of predetermined level to produce a first significant signal, and said second torque-transmitting means being yieldably responsive to a torque of predetermined lower level to produce a second significant signal.

5. The combination with a single drive shaft and apparatus adapted to be driven by the single drive shaft, of interconnecting driving means including inner and outer apparatus driving elements mounted concentrically of the shaft, first deformable torque-transmitting means drivably connecting the inner one of the apparatus driving elements to the shaft and second deformable torque-transmitting means drivably connecting the outer one of the apparatus driving elements to the inner one, the first and second torque-transmitting means being responsive at predetermined different torque levels to produce signals independently of each other.

References Cited in the file of this patent

UNITED STATES PATENTS 2,544,604    Mader                Mar. 6, 1951
2,975,566    Backer               Mar. 21, 1961